United States Patent
Selten

[11] Patent Number: 5,731,822
[45] Date of Patent: Mar. 24, 1998

[54] PICTURE DISPLAY DEVICE, PROJECTION DEVICE PROVIDED WITH THREE SUCH PICTURE DISPLAY DEVICES, AND PICTURE TUBE SUITABLE FOR USE IN SUCH A PICTURE DISPLAY DEVICE

[75] Inventor: Wilhelmus N.M. Selten, Eindhoven, Netherlands

[73] Assignee: U.S. Philips Corporation, New York, N.Y.

[21] Appl. No.: 858,201

[22] Filed: Mar. 26, 1992

[30] Foreign Application Priority Data

Apr. 2, 1991 [EP] European Pat. Off. ............ 91200760

[51] Int. Cl.$^6$ .................................................. H04N 5/647
[52] U.S. Cl. .......................... 348/825; 348/830; 348/824
[58] Field of Search ........................... 358/229, 230, 358/242, 247, 250, 60, 64, 231, 237, 238

[56] References Cited

U.S. PATENT DOCUMENTS

| | | | |
|---|---|---|---|
| 4,631,594 | 12/1986 | Imabayashi | 358/231 |
| 4,646,143 | 2/1987 | Watanabe et al. | 358/237 |
| 4,651,217 | 3/1987 | Yamazaki | 358/60 |
| 4,725,755 | 2/1988 | Hasegawa | 358/250 |
| 4,729,031 | 3/1988 | Saito et al. | 358/237 |
| 4,933,599 | 6/1990 | Fukuda | 358/237 |

FOREIGN PATENT DOCUMENTS

| | | | |
|---|---|---|---|
| 0239150 | 9/1987 | European Pat. Off. | H01J 29/00 |
| 59-113401 | 6/1984 | Japan | G02B 3/12 |
| 013945A | 1/1989 | Japan | 358/60 |

*Primary Examiner*—Thomas D. Lee
*Assistant Examiner*—Jerome Grant
*Attorney, Agent, or Firm*—Walter M. Egbert, III

[57] ABSTRACT

A picture tube and lens system are combined to form a picture display device for use in a projection device. The lens system is mounted in an extension of the tube envelope.

7 Claims, 3 Drawing Sheets

1

PICTURE DISPLAY DEVICE, PROJECTION DEVICE PROVIDED WITH THREE SUCH PICTURE DISPLAY DEVICES, AND PICTURE TUBE SUITABLE FOR USE IN SUCH A PICTURE DISPLAY DEVICE

BACKGROUND OF THE INVENTION

The invention relates to a picture display device provided with a lens system arranged in a lens holder and with a picture tube which comprises a cone and a picture window connected to the cone.

The invention also relates to a projection device provided with at least one series of three such picture display devices, and to a picture tube suitable for such a picture display device.

In a picture display device known from European Patent Application EP-A1 0239150, the picture tube is connected to the lens holder by means of a ring, a support which is common to three picture display devices, an optical element and a retaining frame. A disadvantage of this known device is that comparatively many components are necessary for connecting the picture tube to the lens holder. As a result, the picture display device is sensitive to mounting tolerances. The automatic assembly of the picture display device is also complicated owing to the many components.

OBJECTS AND SUMMARY OF THE INVENTION

The invention has for its object to provide a picture display device in which the picture tube and the lens holder are connected to one another in a simple and comparatively direct manner. According to the invention, this object is achieved in that the lens holder is connected to an inner wall of an extension which is integral with the picture tube.

The picture tube comprises the cone, the extension, and the picture window, the picture window being connected to the cone. The cone and the extension together form an integral whole which has the general shape of a bottle without bottom, a narrow portion thereof being provided with an electron gun, while in a wide portion the picture window and the lens holder are mounted. The cone and the extension are manufactured from one type of material.

It is noted that Japanese Patent Application 59-113401 discloses a picture display device in which the picture tube and the lenses of a lens system are shown to be manufactured in one integral piece. Such a construction of picture tube and lens system can only be obtained by a comparatively large number of operations.

An embodiment of a picture display device according to the invention is characterized in that the lens system and the picture tube are adjustable relative to one another. During a preliminary assembly step, the lens holder is connected to the picture tube, the lens holder and the picture tube being positioned and aligned relative to one another. The position of the lens holder relative to the picture tube is checked during final assembly. If deviations from a desired position are found, the lens holder is adjusted relative to the picture tube.

An alternative embodiment of a picture display device according to the invention is provided with a cooling space situated between the picture window and the lens system. This embodiment is characterized in that a connection by which the picture window is connected to the cone constitutes a closed edge of the cooling space.

A picture display device is obtained in this way which is provided with a cooling space with a minimum number of edges to be sealed in a comparatively simple manner, so that the cooling space can be readily made impervious to liquids and vapours. The edges of the cooling space to be sealed are formed at one side by the connection between the picture tube and the lens holder and at another side by the connection between the cone and the picture window. High requirements are imposed on the connection between the cone and the picture window, because the space between the picture window and an electron gun mounted in the cone after the picture window must be evacuated. The other connection must seal off the cooling space at the lens holder side. This may be done with a sealing as method described in European Patent Application EP-A1 0239150. In this way, two connections can suffice in the picture display device.

DESCRIPTION OF THE DRAWING

The invention is explained in more detail with reference to the drawing in which.

DESCRIPTION OF THE PREFERRED EMBODIMENT

Figure 1:
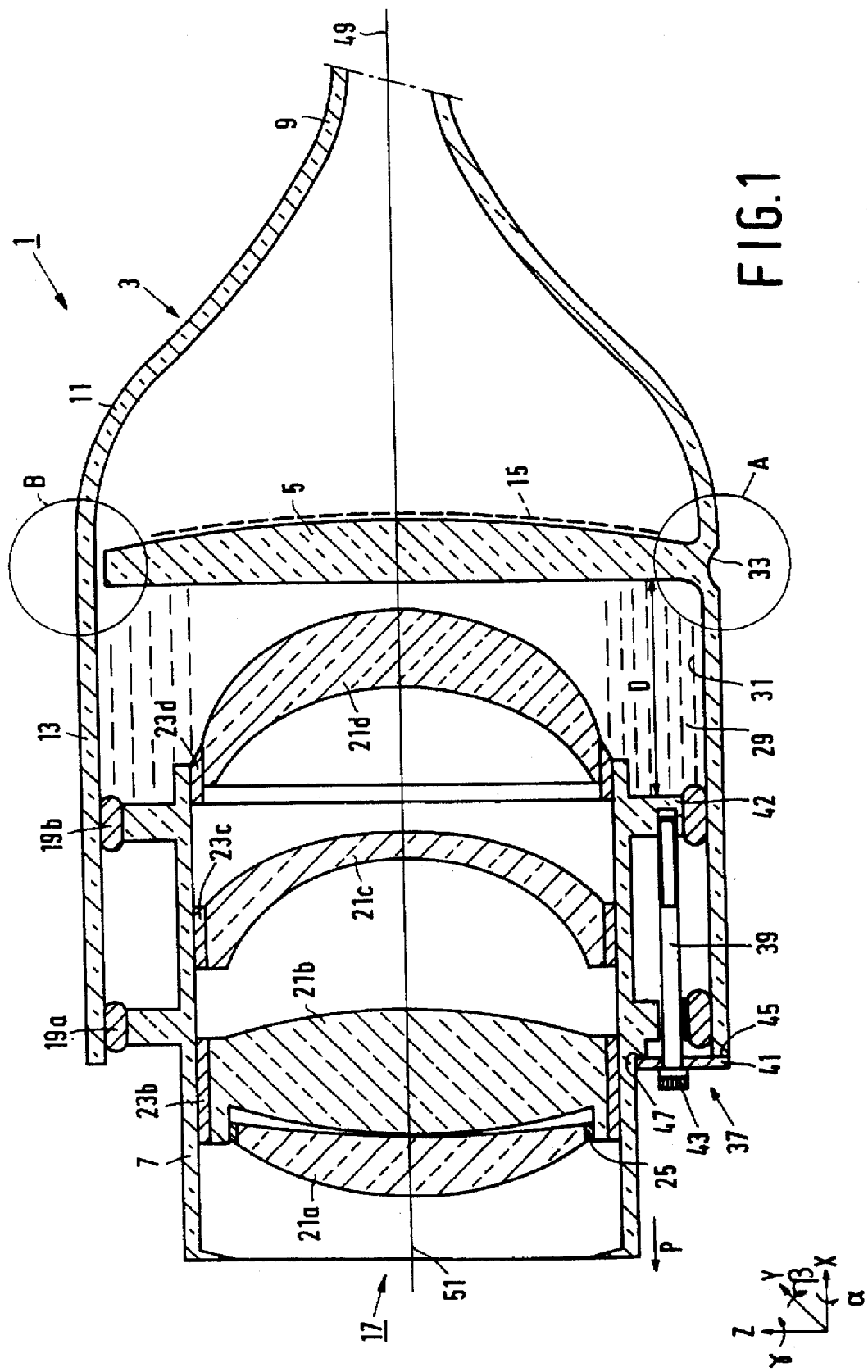
FIG. 1 shows a first embodiment of a picture display device according to the invention.

FIG. 1 shows a picture display device 1 which comprises a glass picture tube 3 and a glass lens holder 7 connected to the picture tube 3. The picture tube 3 comprises a neck 9 in which an electron gun (not shown) is present, a cone 11, a glass picture window 5 connected to the cone by means of a glass-glass seal, and a circular cylindrical extension 13 which forms an integral whole with the cone 11. The cone 11 has a circular cross-section transverse to the centreline 49 of the picture tube. The cone 11 and the extension 13 are manufactured as an integral whole by, for example, pressing, blowing, or centrifugal moulding. In the case of blowing, a bottle shape is first blown, after which the bottom of the bottle shape is removed, so that in fact a picture tube 3 without picture window remains. The picture window 5 is then provided in the picture tube 3. The picture window 5 is connected to the cone by means of a fused seal 33 (see detail A in FIGS. 1 and 2). The situation before connecting is shown in detail B in FIGS. 1 and 2. A phosphor pattern 15 is provided on the picture window 5 after the picture window 5 and the cone 11 have been sealed together.

A circular cylindrical glass lens holder 7, which forms the support of a lens system 17, is arranged in the extension 13 of the picture tube 3. The lens holder 7 is connected to the extension 13 by means of two annular elastic glue layers 19a and 19b. The lens system 17 comprises a group of glass lenses 21a, 21b, 21c and 21d, of which the lenses 21b, 21c and 21d are connected to the lens holder 7 with elastic annular glue layers 23b, 23c and 23d, respectively. Lens 21a of the lens system 17 is supported by lens 21b and connected thereto with a glue layer 25. The glue layers 19a, 19b, 23b, 23c, 23d and 25 are elastic so that they can absorb small differences in expansion of the lenses and the lens holder 7 in the case of temperature changes. The lens 21d is a concave lens which focuses a light beam coming from the picture window 5 into the lens system 17. The extension 13 and the picture window 5 together with the lens holder 7 and the lens 21d form walls of a cooling space 29. A cooling liquid 31 is present in the cooling space 29. The glue layers 19b, 23d and the fused seal 33 between the picture window 5 and the cone 11 serve to seal off the cooling space 29. The cooling liquid 31 is introduced into the cooling space 29 before the lens holder 7 is connected to the extension 13 of the picture tube 3. Two connections between picture tube 3, picture window 5 and lens holder 7 can suffice if lens 21d is constructed as part of the lens holder 7.

Figure 2:
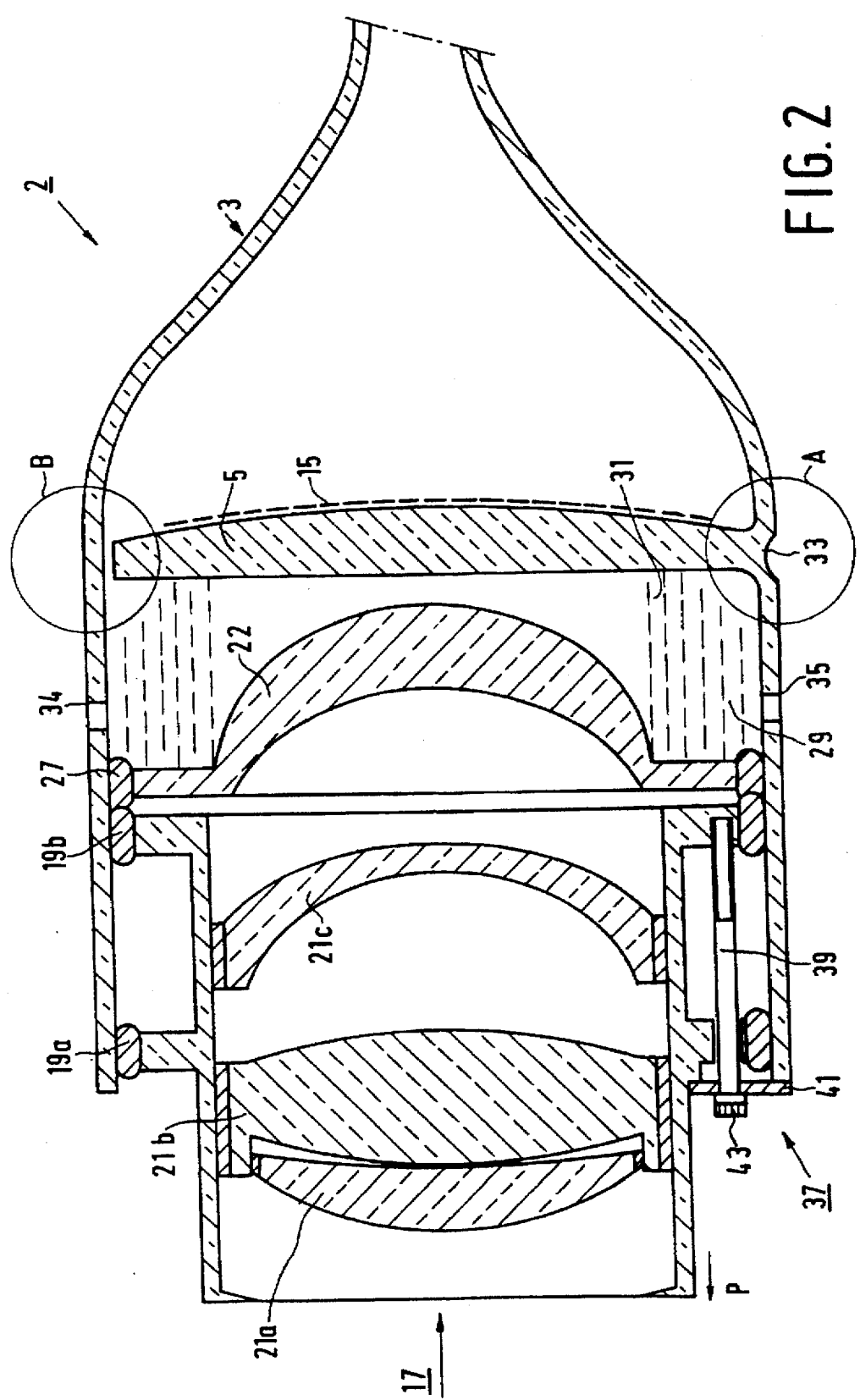
FIG. 2 shows a second embodiment of a picture display device according to the invention.

To provide the possibility of adjustment of the lensholder 7 into the desired position relative to the picture tube 3, the picture display device 1 is provided with three identical adjustment mechanisms 37, which are evenly distributed over the circumference of the lens holder 7. As FIGS. 1 and 2 show, each adjustment mechanism 37 comprises a bolt 39 and a plate 41. The bolt 39 is passed through a hole in the plate 41 and screwed into a flange 42 of the lens holder 7. A head 43 of the bolt 39 presses the plate 41 against a rim 45 of the picture tube 3 and a rim 47 of the lens holder 7. When one of the three bolts 39 is screwed into the flange 42 of the lens holder 7, the lens holder 7 will move in the direction of the arrow P against the resilience of the glue layers 19a and 19b. The rim 47 of the lens holder 7 thereby presses in the direction of arrow P against the plate 41, which as a result will perform a tilting movement about rim 45 of the picture tube 3. Owing to this tilting movement, the bolt 39 together with the lens holder 7 will also be displaced in the direction of the arrow P. This adjustment mechanism 37 renders comparatively small displacements of the lens holder 7 relative to the picture tube 3 in the direction of arrow P possible. The lens holder 7 will also perform a tilting movement relative to the picture tube 3 in that a displacement of the lens holder 7 relative to the picture tube 3 is effected by means of one of the three adjustment mechanisms 37. Displacements in a direction opposite to arrow P are not possible with this adjustment mechanism 37. It is necessary, therefore, for the lens holder 7 to be fastened at a distance D from the picture window 5 which is always smaller than or equal to the desired distance during assembly with the picture tube 3. The distance D is then increased to the desired distance during the adjustment step by means of the three adjustment mechanisms 37.

The centrelines 49, 51 of the lens system 17 and of the picture tube 3 are brought into one another's extension during mounting of the lens holder 7 in the picture tube 3.

By carrying out identical displacements of the lens holder 7 relative to the picture tube 3 the three adjustment mechanisms 37, the centreline 49 of the picture tube 3 will continue to coincide with the centreline 51 of the lens system 17. If the three adjustment mechanisms cause different displacements, the lens holder 7 will be tilted in the picture tube 3 and the centrelines 49, 51 will enclose an angle. This angle, the so-called Scheimpflug angle (see, for example, U.S. Pat. No. 4,672,458), serves to obtain a correctly composed picture with an assembly of several picture display devices 1 (see FIG. 3). This angle is at most a few degrees and is accordingly not shown in the Figures. It is possible with the three adjustment mechanisms 37 to adjust the lens holder relative to the picture tube 3 in three directions (rotation/β about the y-axis, rotation γ about the z-axis, and a translation along the x-axis). Extra adjustment mechanisms must be added for an adjustment possibility of the lens holder 7 relative to the picture tube 3 in the other directions (rotation β about the x-axis, and translations along the y-axis and z-axis). The extra adjustment mechanisms are unnecessary thanks to a correct alignment of the centrelines 49, 51 of the lens holder 7 relative to the picture tube 3.

FIG. 2 shows a second embodiment of a picture display device 2 according to the invention. Components corresponding to those in FIG. 1 are given the same reference numerals.

A picture window 5, a lens system 17 and a lens 22 are positioned in the picture tube 3. The lens system 17 comprises a group of glass lenses 21a, 21b, 21c. The lens 22 in this embodiment is constructed as a lens which is to be separately mounted in the picture tube. The lens 22 is a concave lens which focuses a light beam coming from the picture window 5 into the lens system 17, and is connected to the picture tube 3 by means of an annular glue layer 27. The glue layer 27 and the fused seal 33 form two connections which are impervious to liquids and vapours. The picture tube 3 is provided with an inlet 34 to and a drain opening 35 from the cooling space 29 through which the cooling liquid 31 is pumped into and from the cooling space 29 by means of a liquid pump (not shown).

Figure 3:
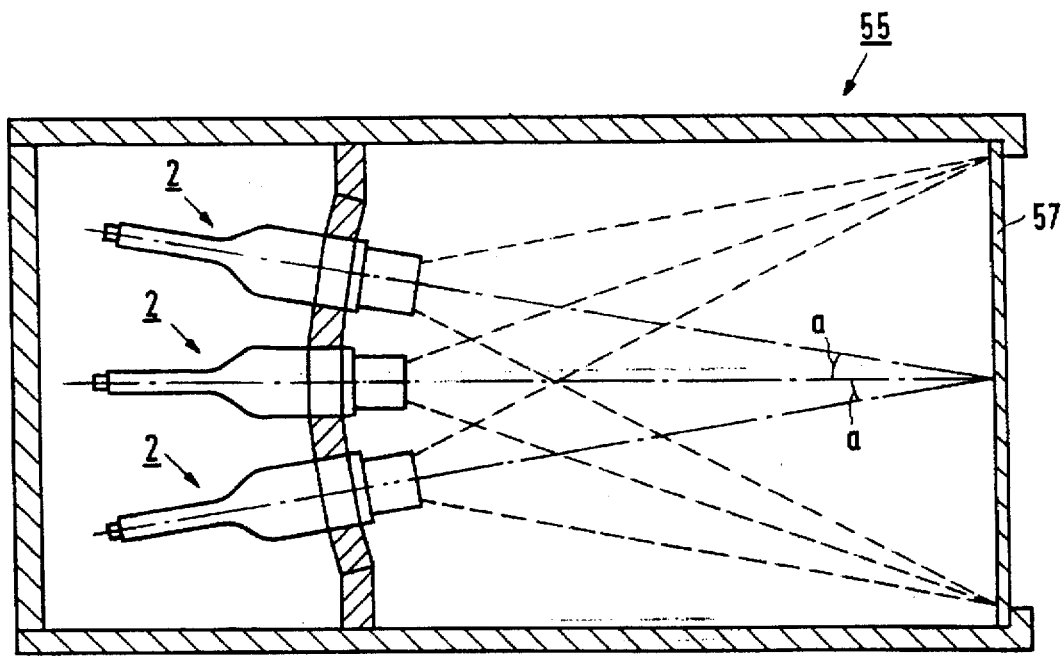
FIG. 3 shows a portion of a projection television device.

FIG. 3 shows a portion of a projection television device 55 provided with three picture display devices 2 according to FIG. 2. The picture display devices 2 enclose angles λ of approximately 8° with one another, the angle λ and the Scheimpflug angle being so chosen, for example in accordance with the U.S. Pat. No. 4,672,458, that the three picture display devices 2 jointly project a picture on a picture screen 57. The projection television device 55 is shown diagrammatically only for simplicity's sake. A more detailed description of a projection television device in which the picture display device according to the invention may be used is given in, for example, U.S. Pat. No. 4,479,144 or U.S. Pat. No. 4,62 1,293.

The inlet 34 and drain 35 of the individual picture display devices may each be separately connected to a liquid pump (not shown), or form a single cooling liquid system, as in European Patent EP-A1 0239150.

In the embodiments of the picture display devices of FIGS. 1 and 2, the lens holder may be clamped in the picture tube by the use of an O-ring instead of glue layers 19a and 19b. To position the lens holder relative to the picture tube in axial direction, a glued connection may be used, for example. The lens holder may alternatively be connected to the picture tube at a few points on its circumference instead of with the annular glue layer 19a.

The picture window may be rectangular rather than circular. In such case, the entire surface area of the picture window 5 can be used for imaging by giving the cone and the extension a rectangular shape in a cross-section transverse to the centreline of the picture tube. The lens holder is also rectangular then, with a centrally positioned circular recess for accommodating the circular lenses. As a result, the picture display device is very compact.

The glass lens holder may be provided with a layer in its side facing the lenses which is to prevent reflections of the light beam coming from the picture tube 3 on the lens holder 7.

If substantially all elements of the picture display device are manufactured from glass, all elements will expand to the same degree with a temperature rise. It is alternatively possible, however, to manufacture the lens holder, cone and extension from other materials, such as synthetic material or a metal, which may be attractive for example, for reasons of manufacturability.

I claim:

1. A picture display device comprising:
   (a) a picture tube comprising an envelope, the envelope comprising;
      (1) a narrow neck portion,
      (2) a wide extension portion,
      (3) an intermediate cone portion interconnecting the neck and extension portions into an integral whole which is bottle-shaped, and (4) a picture window sealed to the cone;

(b) a lens system comprising a lens holder and lenses secured to the lens holder; and (c) means for sealing the lens system to an inner wall of the wide extension portion of the envelope.

2. The picture display device of claim 1 in which means are provided for adjusting the position of the lens system relative to the picture tube.

3. The picture display device of claim 2 in which the picture window, the inner wall of the extension portion and the lens system form a cooling space, and cooling liquid fills the cooling space.

4. A projection display device comprising a display screen and three picture display devices as claimed in claim 2, the picture display devices arranged to project overlapping display images on the projection screen.

5. The picture display device of claim 1 in which the picture window, the inner wall of the extension portion and the lens system form a cooling space, and cooling liquid fills the cooling space.

6. A projection display device comprising a display screen and three picture display devices as claimed in claim 5, the picture display devices arranged to project overlapping display images on the projection screen.

7. A projection display device comprising a display screen and three picture display devices as claimed in claim 1, the picture display devices arranged to project overlapping display images on the projection screen.

* * * * *